United States Patent [19]

Schoonmaker

[11] 4,147,450
[45] Apr. 3, 1979

[54] FIXED DREDGE CLEANOUT MEANS

[76] Inventor: Townsend L. Schoonmaker, 265 Summit Ave., San Rafael, Calif. 94111

[21] Appl. No.: 866,026

[22] Filed: Dec. 30, 1977

Related U.S. Application Data

[63] Continuation-in-part of Ser. No. 427,077, Dec. 21, 1973, Pat. No. 4,074,535.

[51] Int. Cl.$^2$ .............................................. E02B 3/02
[52] U.S. Cl. ......................................... 405/74; 37/61
[58] Field of Search .................... 61/1 R, 2, 3; 37/58, 37/61, 62, 63

[56] References Cited

U.S. PATENT DOCUMENTS

| | | | |
|---|---|---|---|
| 510,713 | 12/1893 | Scott | 61/2 |
| 2,442,358 | 6/1948 | Harp | 61/2 |
| 3,013,395 | 12/1961 | Gaylord | 61/2 |
| 3,638,432 | 2/1972 | Schoonmaker | 61/2 |
| 4,074,535 | 2/1978 | Schoonmaker | 61/2 |

*Primary Examiner*—Mervin Stein
*Assistant Examiner*—David H. Corbin
*Attorney, Agent, or Firm*—Limbach, Limbach & Sutton

[57] ABSTRACT

A generally horizontal pipe extends across the bottom of a waterway to be dredged and, in some embodiments is connected to a suction pump at or below the low water level. Lateral passageways are distributed along the length of the horizontal pipe with a number of smaller orifices located along the pipe's length between the passageways. Any sediment build-up above a passageway and several nearby smaller orifices, which may be due to a passageway being clogged with a large object, is cleared by a manually operated source of high pressure fluid where fluid jet streams are directed against the build-up of sediment in a manner so as to churn or break up the sediment build-up and permit the sediment to be drawn into adjacent passageways and orifices.

1 Claim, 3 Drawing Figures

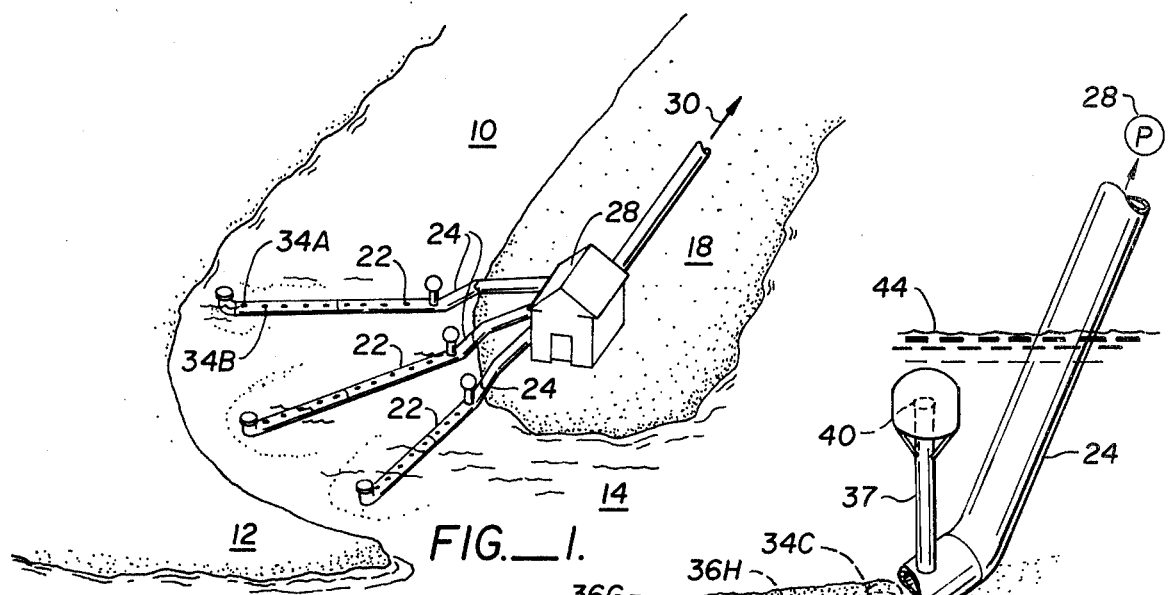
FIG._1.
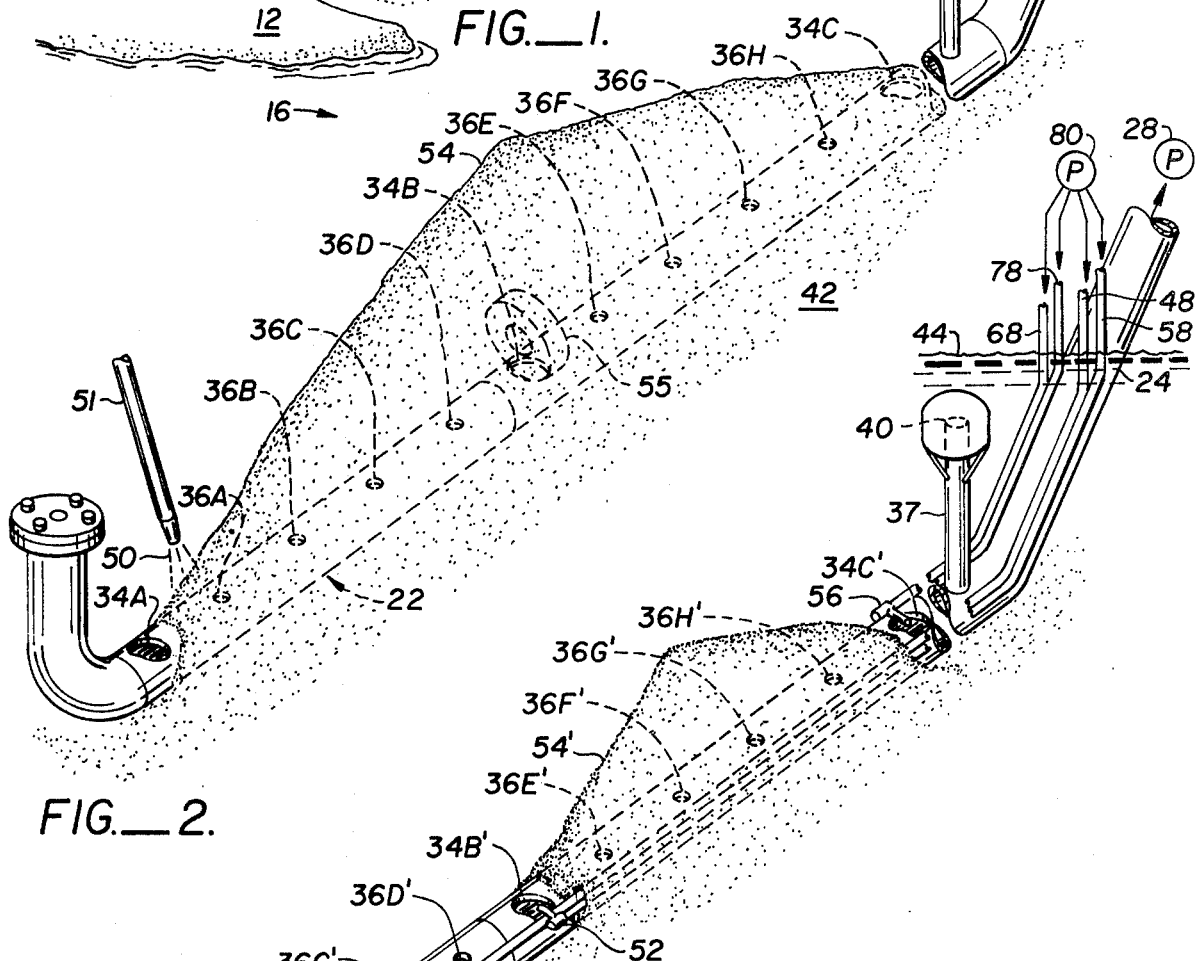
FIG._2.
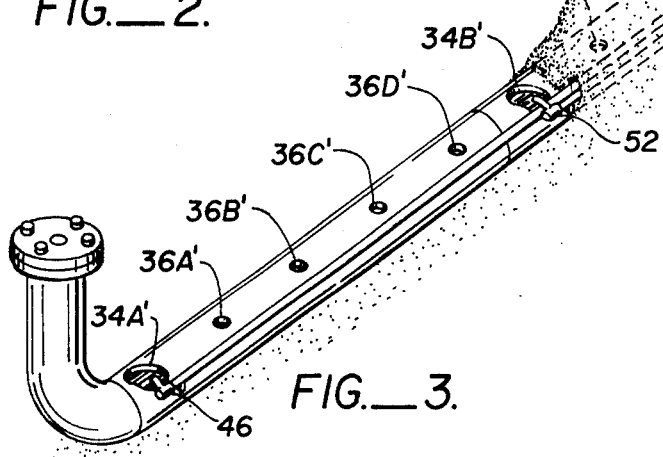
FIG._3.

FIXED DREDGE CLEANOUT MEANS

CROSS-REFERENCE TO RELATED APPLICATION

This application is a continuation-in-part of my co-pending U.S. application, Ser. No. 427,077, filed Dec. 21, 1973 for SELF-CLEANING FIXED DREDGE, now U.S. Pat. No. 4,074,535.

BACKGROUND OF THE INVENTION

The present invention relates to a stationary dredging apparatus for automatically removing sand and silt from waterways, and more particularly, to means for cleaning out the dredge and removing any sedimentary deposits and objects that have clogged the perforations or openings along the dredge thereby blocking the fluid stream in the dredge.

In U.S. Pat. No. 3,638,432 which issued to the present applicant, a stationary dredge is disclosed in which a generally horizontal pipe is laid on the bottom of the waterway which is connected to the suction line of the pump. The horizontal line is provided with a plurality of perforations or openings into which sand and silt are drawn by the suction of the pump. Clear water, that is water that is clear of sand and silt, is supplied to the horizontal line near the perforations closest to the connection to the pump to dilute the slurry passing through the perforated pipe and thereby reduce clogging. One disadvantage of this system is that when used in areas having high kelp growth or where a large amount of non-granular debris such as cans, bottles or waterlogged driftwood for example, have settled on the bottom these non-granular debris are drawn by suction over the perforations thereby clogging them. This same disadvantage also pertains to other types of silt removing perforated lines which rest on the bottom of a waterway.

U.S. Ser. No. 427,077, the parent to the present case, provides for a self-cleaning stationary conduit for removing sand and silt materials from the conduit which comprises a plurality of nozzles which provide a high velocity of water jets into a plurality of orifices along the stationary pipeline. The high velocity jets of water mix with the bottom sand near the stationary conduit to degrade any solid material which tends to block the orifices of the conduit. The invention as disclosed in the parent application will clear the orifice opening of any debris build-up where the debris consists of small objects or deposits of sediment, but it is still possible for a passageway to be blocked by a large object. Thus, the high velocity of water jets emanating from the nozzles may only serve to puncture a hole in one side of some very large object without removing the entire object. It therefore follows that some means for manually removing large objects, such as tires, from above or about the orifice openings is desirable.

The problem of removing the obstructing object is not serious because on the rare occasions when such an obstruction occurs, a diver can be sent down to clear it. The real problem, however, is how to get to the obstruction. Typically, the passageways into the dredging pipe may be ten feet apart and the dredging pipe may be thirty (30) feet below the surface of the sand when dredging starts. Thus, the obstruction at one passageway may be under the center of a pile of sand twenty feet long, or more, and six (6) or more feet high. The pile of sand problem would not be so great if the passageways into the pipe were closer together, but the pipe can have only a limited number of passageways of a given size for a given pump size so that making the passageways closer together would require that the pipe be shorter and hence less effective in maintaining a large dredged area.

SUMMARY OF THE INVENTION

The above and other disadvantages are overcome by the present invention of a stationary conduit line which is provided with means for cleaning out the dredge which comprises a generally horizontal pipe located near the bottom of a waterway to be dredged, the horizontal pipe being provided with a plurality of openings of two different diameters—one group of a smaller diameter (called orifices) which are distributed along the pipe's length between the group having the larger diameter (called passageways) which are also distributed along the length of the pipe. Means are provided for causing water to flow through the pipe so as to create a suction in the pipe which draws a water slurry mixture into the pipe through the passageways along the pipe's length. When a mound of debris and sediment blocks one passageway, a diver can get access to the object by eroding the mound with a hydraulic jet starting at the adjacent clear passageway while the churned up material from the mound is carried away into the orifices which are uncovered sequentially. Once the mound is sufficiently reduced, the diver can then manually remove the larger object which was lodged about the passageway opening. The smaller orifices along the stationary conduit are sufficiently small so that they normally plug up with debris under normal operating conditions. Thus, the small orifices don't materially increase the total area of openings into the pipe and for that reason they don't restrict the length of the pipe.

Various features and advantages of the invention will be more readily understood upon consideration of the following detailed description of certain preferred embodiments of the invention taken in conjunction with the accompanying drawings.

BRIEF DESCRIPTION OF THE DRAWINGS

FIG. 1 is a perspective view of a waterway which is protected by a stationary dredging apparatus of this invention;

FIG. 2 is an enlarged, perspective view of the dredging apparatus according to one embodiment of the invention showing the apparatus in a condition where the clean out feature of the invention is about to be used; and FIG. 3 is a perspective view of one preferred embodiment of the invention showing the apparatus in a condition immediately after the invention has been used.

DESCRIPTION OF CERTAIN PREFERRED EMBODIMENTS

Referring now more particularly to FIG. 1, a waterway 10 extends through the beach 12 to an ocean 14 providing a channel for cooling water through a thermo-electric plant, for example. A lateral current, indicated by arrow 16, provides a hazard for beach shoaling which is prevented by a breakwater 18 protecting the mouth of the waterway 10. While the breakwater protects the mouth of the waterway from shoaling, some shoaling will still occur particularly during storms which tends to deposit sand in the quiet water behind the breakwater 18, necessitating periodic dredging of the mouth of the waterway for adequate water flow through the waterway during low tide.

The stationary dredging apparatus of the invention is installed to remove sand deposits at the mouth of the waterway 10 by periodically or continuously drawing sand and water into one or more underwater, perforated pipes 22 which are separately connected through pipes 24 to the suction side of a dredging pump 28 which is preferably below water level (shown as installed in a pump house). The discharge of the pump extends in the direction of the arrow 30 along the breakwater 18, for example to a suitable disposal area.

As best shown in FIG. 2, passageways 34A, 34B and 34C and orifices 36A, 36B, 36C, 36D, 36E, 36F, 36G and 36H are provided along the upper side of the pipe 22. A clear water supply to prevent clogging is provided to the pipe by means of a vertical conduit 37 having an intake opening 40 at its top which is located above the normal bottom 42 of the waterway but below the water level 44. In a preferred form of the invention, the apparatus illustrated in FIG. 2 is connected to a suction dredging pump 28 (shown in the pump house) having a capacity of 15,000 gallons per minute at a rated input suction of 24 inches of mercury and an output pressure of 177 feet of water, for example. The pump is driven by an electric motor (not shown) having a rated horse power of about 1,500. The pipes 22 and 24 are twenty inches in diameter. Pipe 37 is 20 inches in diameter and the opening 40 is 10 inches in diameter and the passageways 34A, 34B and 34C are 10 inches in diameter and orifices 36A, 36B, 36C, 36D, 36E, 36F, 36G and 36H are three inches in diameter. Passageways 34A, 34B and 34C are spaced ten feet apart and orifices 36A, 36B, 36C, 36D, 36E, 36F, 36G and 36H are spaced on two feet centers along the horizontal pipe 22 between passageways 34A, 34B and 34C.

Because of the limited capacity of pump 28 which operates to keep passageways 34A, 34B and 34C open, it is desirable that passageways 34A, 34B and 34C be spaced as far apart as possible to dredge as long a trough as possible with a single pipe. The area of passageways 34A, 34B and 34C and the area of orifices 36A, 36B, 36C, 36D, 36E, 36F, 36G and 36H are selected, depending on the area of pipe 22 and the capacity of pump 28, so that the passageways are generally kept open by suction pump 28 and the smaller orifices are generally not cleared by pump 28 being plugged by debris. Generally, each of the smaller orifices are designed to have an area which is less than one-fourth the area of each of the larger passageways.

When in operation, one of the passageways 34A, 34B or 34C (here 34B) may become clogged due to some object, such as a tire 55, becoming lodged about its opening a large mount 54 of sediment builds up above its opening and the openings of adjacent smaller orifices, thereby impeding the flow of water and sediment through pipe 22. When this happens, a diver operating a cleaning jet 51 directs a high velocity fluid stream 50 against the mound build-up 54 of sediment deposits thereby churning up the mound of sand and permitting the sediment in its broken- up form to pass through the adjacent openings and into pipe 22. The process of removing the mound starts at one uncovered passageway (here 34A) and progresses sequentially to orifice 36A then orifice 36B until the obstruction at passageway 34B is reached. During the cleaning process, the orifices 36A, 36B, 36C, 36D, or 36E, 36F, 36G and 36H which would be normally closed, provide a place where the diver can get rid of the bulk of sand in the mound without having to transport it to the passageway 34A. The diver can then manually get to the object which is blocking the passageway (here 34B) to remove such object.

FIG. 3 illustrates a preferred embodiment of the invention which has the nozzles 46, 52 and 56 of the pending parent application, U.S. Ser. No. 427,077, connected by pipes 48, 58, 68 and 78 respectively to pump 80 and arranged about passageways 34A', 34B' and 34C' in the same manner as described in U.S. Ser. No. 427,077. Orifices 36A', 36B', 36C', 36D',36E', 36F', 36G' and 36H' are distributed along the length of pipe 22 between passageways 34A',34B' and 34C' in the manner as described above. Similarly, smaller orifices are distributed between passageways 34B' and 34C'. As described in U.S. Ser. No. 427,077, nozzles 46 and 52 are directed from right to left across passageways 34A', 34B' while nozzle 56 is pointed in the opposite direction across passageways 34C'. This arrangement of the nozzles produces a balanced pattern of clearing water jets which either blow debris away from passageways 34A', 34B' and 34C', or, together with the sand stirred up by the water jets emanating from the nozzles, abrades debris such as tin cans, bottles and kelp. As disclosed in U.S. Ser. No. 427,077, the nozzles are pointed so as not to impinge upon the pipe 22. The water jets are thus clear of the passageways 34A', 34B' and 34C' and do not abrade pipe 22. The FIG. 3 apparatus is also connected to a suction pump 28 (shown in the pump house).

The FIG. 3 embodiment shows mound 54' after it has been partially eroded in accordance with the invention as described above. Passageway 34B' has been manually unclogged.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

What is claimed is:

1. A method of clearing dredging lines of the type having a stationary conduit submerged under a body of water near the bottom thereof and having passageways opening into the conduit and distributed along its length and a pump arranged to provide fluid streams entering the conduit through the passageways to carry water and sediment into the conduit where at least one of said passageways is bridged by sediment providing a body at least twice as long as the distance between two passageways, wherein the method comprises the step of:

providing a series of orifices, each having an area substantially less than the area of one of the passageways, opening into the conduit and distributed between each of said passageways, directing fluid jet streams from a manually operated source of high pressure fluid against said body of sediment adjacent to an open one of said passageways to churn the sediment and remove it through said open passageway until one of said smaller orifices is uncovered, directing fluid jet streams against said body of sediment adjacent to the uncovered smaller orifice to draw sediment through the uncovered smaller orifice, and continuing to direct fluid jet streams against said body of sediment to progressively uncover said orifices until said bridges passageway is uncovered.

* * * * *

UNITED STATES PATENT AND TRADEMARK OFFICE
CERTIFICATE OF CORRECTION

PATENT NO. : 4,147,450
DATED : April 3, 1979
INVENTOR(S) : Townsend L. Schoonmaker It is certified that error appears in the above-identified patent and that said Letters Patent are hereby corrected as shown below:

Col. 3, line 53, "mount" should be --mound--.

Col. 4, line 67, "bridges" should be --bridged--.

Signed and Sealed this

Twenty-fourth Day of July 1979

[SEAL]

Attest:

LUTRELLE F. PARKER

Attesting Officer       Acting Commissioner of Patents and Trademarks